United States Patent [19]

Shiozawa et al.

[11] Patent Number: 5,299,423
[45] Date of Patent: Apr. 5, 1994

[54] AIR SUPPLY SYSTEM FOR SUPERCHARGED INTERNAL COMBUSTION ENGINE

[75] Inventors: Shigeki Shiozawa; Yoshikazu Yamaoka, both of Hamamatsu, Japan

[73] Assignee: Yamaha Hatsudoki Kabushiki Kaisha, Iwata, Japan

[21] Appl. No.: 862,992

[22] Filed: Apr. 7, 1992

[30] Foreign Application Priority Data

Apr. 8, 1991 [JP] Japan .................... 3-101781

[51] Int. Cl.$^5$ .................................... F02B 33/44
[52] U.S. Cl. ................................ 60/611; 123/564
[58] Field of Search ............... 60/611, 600, 601; 123/564

[56] References Cited

U.S. PATENT DOCUMENTS

| | | | |
|---|---|---|---|
| 3,464,202 | 9/1969 | Wagner | 123/564 |
| 3,651,636 | 3/1972 | Glassey et al. | 60/611 |
| 4,318,273 | 3/1982 | Nohira et al. | 60/611 |
| 4,425,761 | 1/1984 | Annus | 60/611 |
| 5,125,235 | 6/1992 | Yanagihara et al. | 60/611 |

Primary Examiner—Edward K. Look
Assistant Examiner—Charles G. Freay
Attorney, Agent, or Firm—Ernest A. Beutler

[57] ABSTRACT

Several embodiments of turbocharged internal combustion engines wherein the turbocharger is designed to provide high boost at low and mid range and the boost is reduced at high range to maintain either a limitation of the maximum boost or to maintain the boost pressure in a linear relation to engine speed. The means for reducing the boost pressure comprises a throttle valve in the induction passage that is operated in a variety of manners responsive to engine speed.

8 Claims, 3 Drawing Sheets ns0,423

AIR SUPPLY SYSTEM FOR SUPERCHARGED INTERNAL COMBUSTION ENGINE

BACKGROUND OF THE INVENTION

This invention relates to an air supply system for a supercharged internal combustion engine, and more particularly to an arrangement for increasing the boost power at low and mid ranges without having excess boost at high speed conditions.

It has been proposed to increase the power of an internal combustion engine by employing some form of supercharging for compressing the air charge delivered to the combustion chambers of the engine. Most superchargers used for this purpose provide a boost that increases as the engine speed increases. Many of the superchargers used for this purpose also have a non-linear increase in boost pressure with relation to engine speed such as centrifugal type of superchargers which may be either engine driven or driven by an exhaust turbine (turbochargers). As a result, supercharged engines tend to have a high degree of power at maximum engine speed but their mid range and low speed performance may not be significantly greater than normally aspirated engines. Although these problems can be offset by designing the supercharger to provide higher boost pressures at low and mid range, then excessive boost is generated at high speed and performance can be deteriorated and/or the engine life significantly reduced.

It has been proposed to limit the maximum boost pressure of a supercharger by somehow reducing the speed at which the supercharger is driven as the engine speed increases. With a turbocharger this is done by using a relief valve in the exhaust turbine which opens when the exhaust pressure reaches a certain limit so as to reduce the speed at which the turbocharger is driven. Similar devices may also be employed with positively driven superchargers. Another alternative is to provide a fixed throttle in the discharge from the supercharger so as to reduce the maximum pressure which can be generated in the induction system.

Both of the expedients mentioned have a number of disadvantages. For example, reducing the speed at which the supercharger is driven, for example by using a pressure relief valve, provides a number of disadvantages. First, these relief valves are subjected to very high temperatures and failure rates can be quite high. In addition, the devices can add to the noise in the exhaust system and also add significantly to the cost of the over all engine.

Fixed throttles, on the other hand, tend to reduce the performance not only at high speed but also at low speed and thus are not totally satisfactory.

It is, therefore, a principal object of this invention to provide an improved and simplified arrangement for permitting a supercharger to generate high boost pressures at low and mid range speeds without creating excess boost at high speeds.

It is a further object of this invention to provide an improved and simplified arrangement for reducing the boost pressure generated by a supercharger at high speeds without adversely affecting the boost pressure at low speeds.

It is yet a further object of this invention to provide an improved arrangement for controlling the boost pressure of a turbocharged engine.

SUMMARY OF THE INVENTION

This invention is adapted to be embodied in a supercharged internal combustion engine having at least one cylinder and an induction system for supplying an air charge to the cylinder. A compressor is provided for supplying a compressed air charge to the cylinder. The compressor supplies air at a pressure that does not vary linearly with engine speed. Throttle means are provided in the induction passage for varying the restriction of the air flow therethrough.

In accordance with one feature of the invention, means are provided for operating the throttle means to provide a substantially linear boost pressure from the compressor to the engine at varying engine speeds.

In accordance with another feature of the invention, means are provided for operating the throttle means to reduce the boost pressure at high engine speeds without reducing the boost pressure at lower engine speeds.

DETAILED DESCRIPTION OF THE PREFERRED EMBODIMENTS

Figure 1:
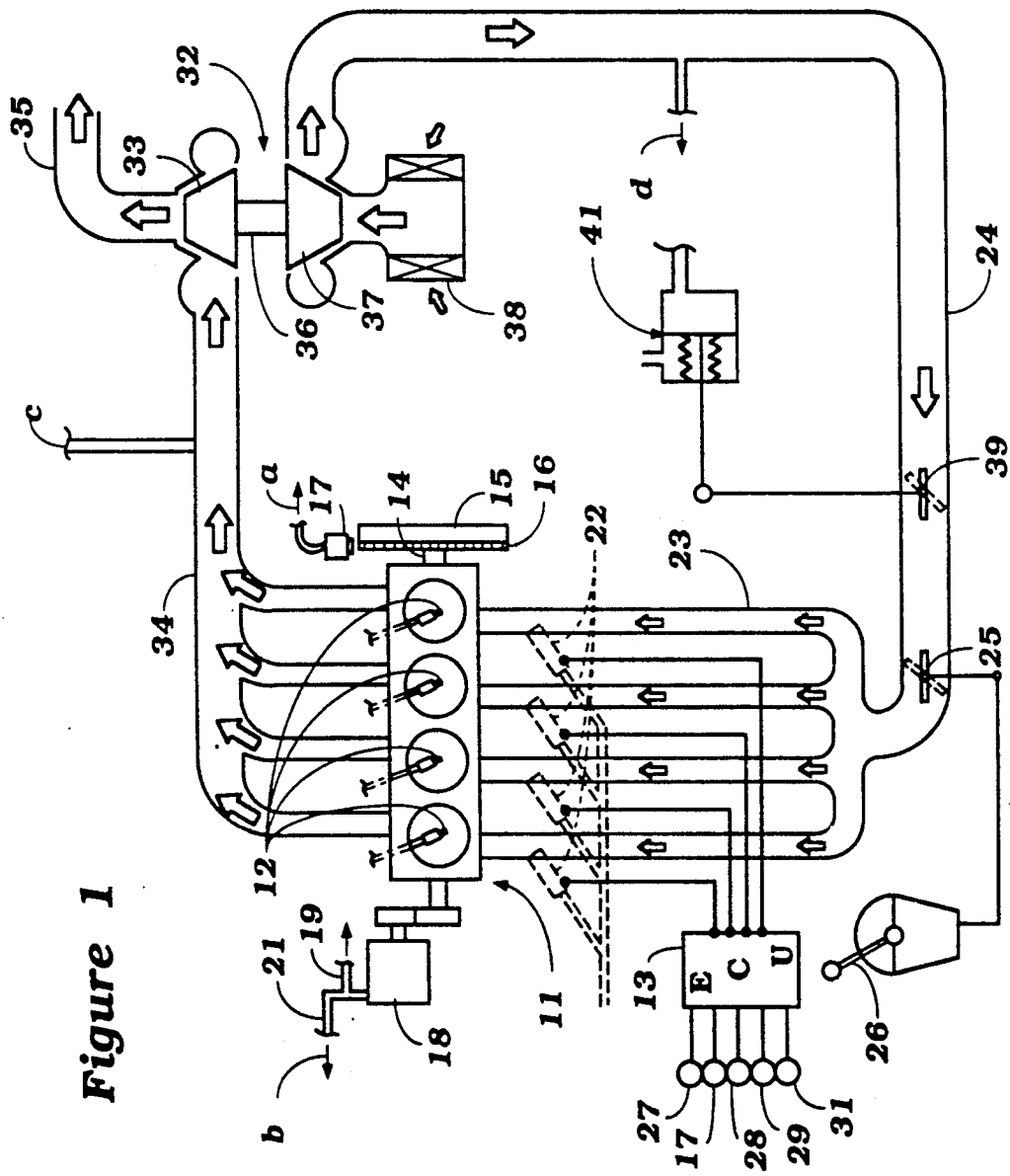
FIG. 1 is a partially schematic view of a turbocharged internal combustion engine constructed in accordance with a first embodiment of the invention.
Figure 2:
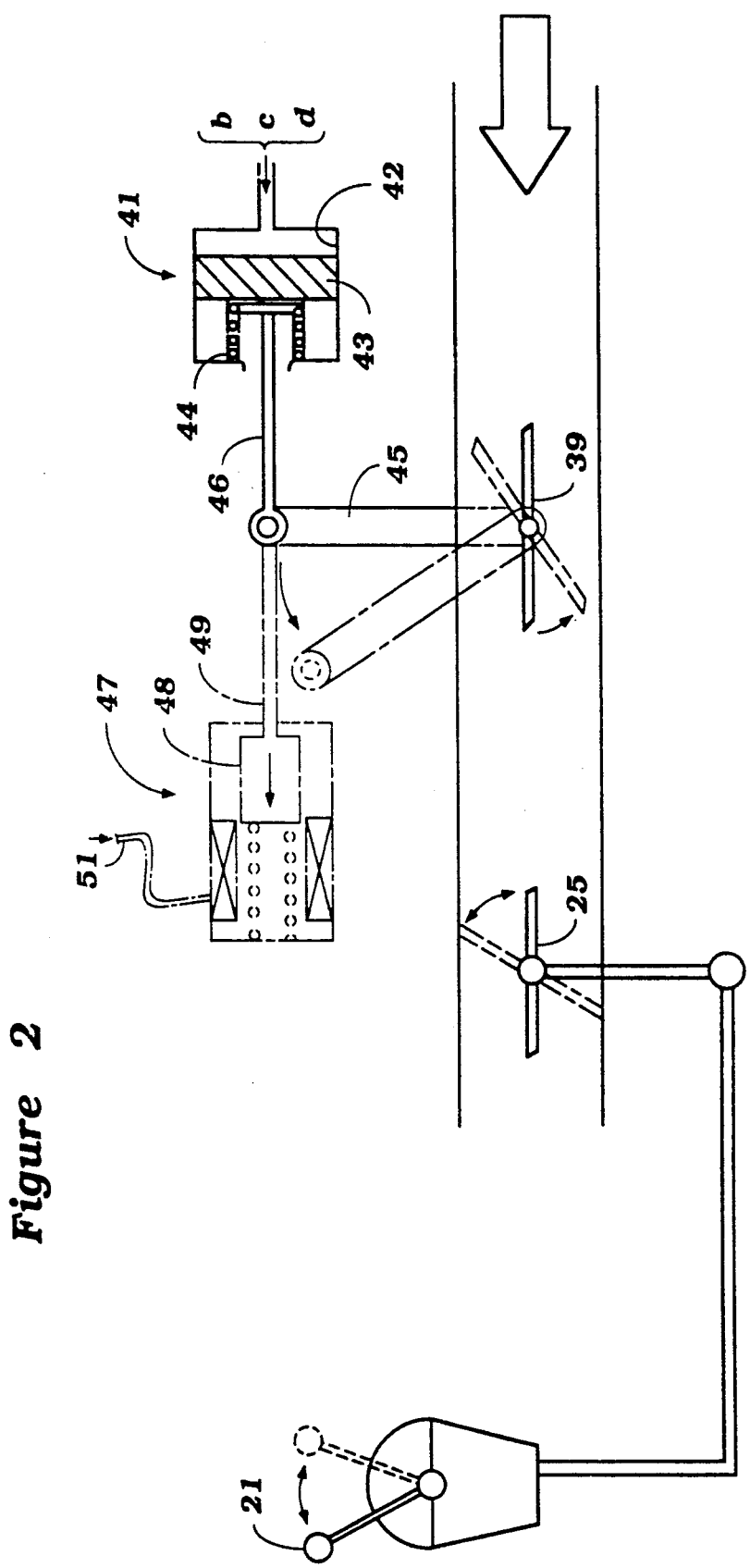
FIG. 2 is an enlarged cross-sectional view showing the arrangement for varying the boost pressure supplied to the engine in accordance with the embodiment of FIG. 1 in solid lines and shows another embodiment in phantom.
Figure 3:
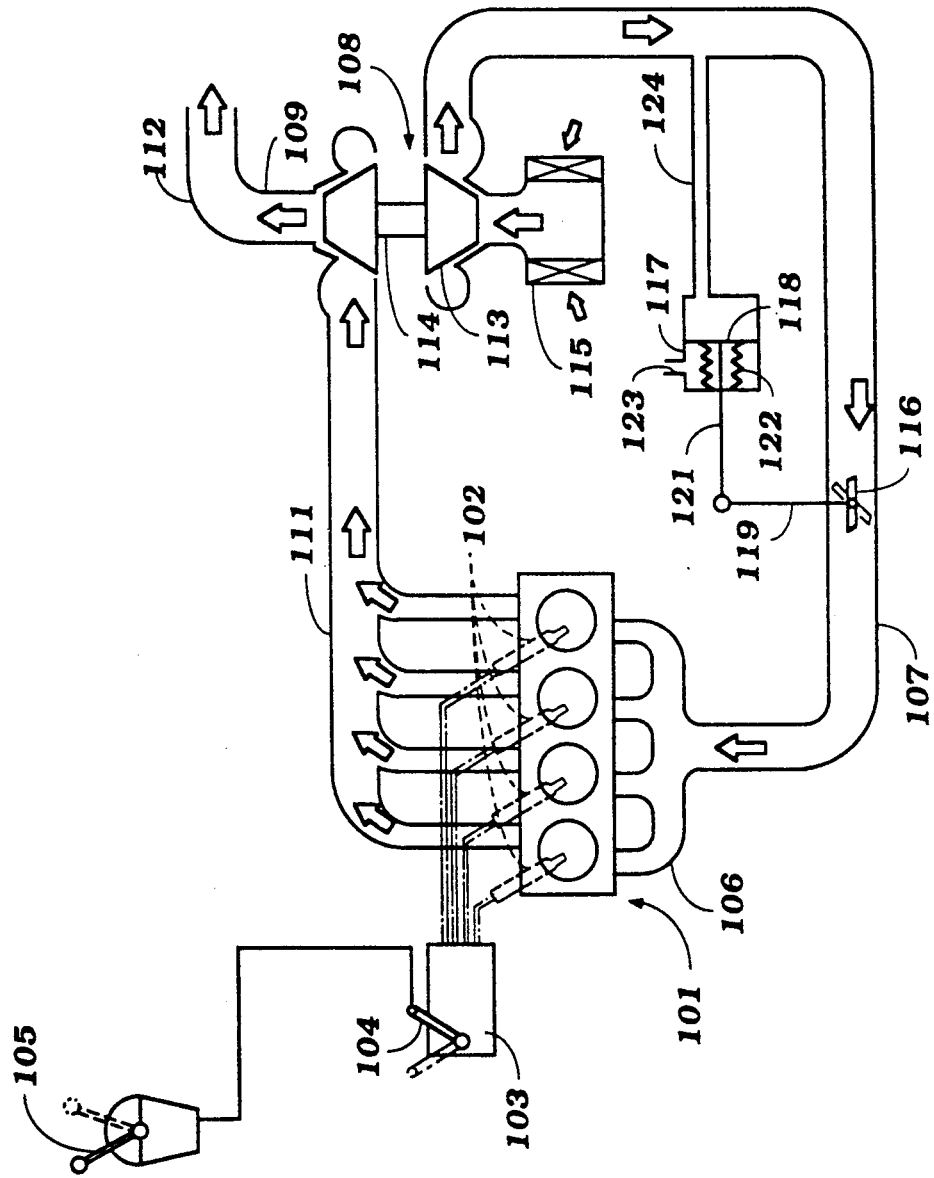
FIG. 3 is a schematic view, in part similar to FIG. 1, and shows the application of the invention to a diesel engine.

Referring first to the embodiments of FIGS. 1 and 2, a spark ignited four cylinder in-line type internal combustion engine constructed in accordance with this embodiment is identified generally by the reference numeral 11. Although the invention is described in conjunction with a four cylinder engine, it should be readily apparent to those skilled in the art that the invention can be practiced with engines having other cylinder numbers or other cylinder types or, in fact, engines other than reciprocating engines. In addition, although this embodiment describes a spark ignited engine, the invention may also be employed in conjunction with engines operating on the diesel cycle and such an embodiment is illustrated in FIG. 3, which will be described later.

Since the internal construction of the engine 11 is generally independent of the invention, the details of the internal construction of the engine are not believed to be necessary to enable those skilled in the art to practice the invention and, for that reason, further description of the internal portion of the engine is not included. However, the engine 11 is provided with four spark plugs 12 which are fired under the control of an ECU 13 in any known manner. The engine 11 drives a crankshaft 14 on which a flywheel 15 having a toothed gear 16 is provided which can be operated by a suitable starter motor (not shown). In addition, a pulser coil 17 cooperates with the gear 16 so as to provide an output signal "a" which is indicative of engine speed. This signal is transmitted to the ECU 13 as shown schematically in FIG. 1.

The engine also has an engine driven lubrication pump 18 that draws lubricant from a suitable source and supplies it to the engine through one or more supply conduits 19. In addition, the lubrication pump 18 is provided with a conduit 21 in which a pressure gauge (not shown) is provided that gives an oil pressure output signal "b" which may be used for a purpose which will be described.

The ECU 13 controls the supply of fuel to the engine from a plurality of fuel injectors 22 which are mounted in the branch conduits of an intake manifold, indicated generally by the reference numeral 23, and which supply both fuel and an air charge to the cylinders of the engine 11. A supply conduit 24 communicates with the manifold 23 and positioned in the supply conduit 24 is a manually operated throttle valve 25 which is controlled by a remote throttle lever 26 so as to control the speed of the engine 11.

The ECU 13 also receives a number of other signals for controlling the amount of fuel supplied to the fuel injectors 22 and the firing of the spark plugs 12. These may include a signal from a sensor 27 indicative of the position of the throttle valve 25, a signal from a sensor 28 indicative of the air supply pressure in the supply conduit 24, a signal indicative of the air supply temperature derived by an air supply temperature sensor 29 and engine temperature as supplied by an engine temperature sensor 31. Any known type of control strategy may be employed and since this is not a feature of the invention, a description of it is believed to be unnecessary.

A turbocharger, indicated generally by the reference numeral 32, is provided for supplying air under pressure to the supply conduit 24. The turbocharger 32 includes an exhaust turbine stage 33 that is driven by the exhaust gases exiting the engine 11 through an exhaust manifold 34 in which the turbine stage 33 is positioned. The exhaust gases are then discharged to the atmosphere through an exhaust pipe 35 and suitable exhaust system (not shown).

The turbine stage 33 is connected to a shaft 36 which drives an impeller or compressor section 37. The compressor section 37 draws air through an air filter 38 and discharges it into the supply pipe 24.

As is well known, turbochargers such as the turbocharger 32 provide a boost pressure that varies non-linearly with engine speed. As a result, if the maximum boost pressure of the turbocharger 32 is such to provide adequate performance at high speed, inadequate boost will be present at low and mid ranges. Therefore, the turbocharger 32 is designed so as to provide a higher boost at low and mid range performance. Thus, excessive boost pressure will be generated at high engine speeds which, if delivered to the engine could cause damage or at least poor performance. This boost pressure is limited in a manner now to be described.

A throttle valve 39 is positioned in the supply conduit 24 upstream of the throttle valve 25. A servo motor, indicated generally by the reference numeral 41, is provided for automatically positioning the throttle valve 39 so as to provide either a boost pressure that varies substantially linearly with engine speed or one which limits the maximum boost without significantly reducing the boost at low and mid range performance.

The servo motor 41, as best shown in FIG. 2, includes a housing defining a chamber 42 in which a piston 43 is slidably supported. The back side of the piston 43 is open to the atmospheric pressure and a coil compression spring 44 provides a bias on the piston 41 which tends to move the throttle valve 39, which is connected to the piston 43 through a throttle control lever 45 and link 46 to its wide open throttle position as shown in solid lines in the figure.

Pressure is supplied to the chamber 42 on the other side of the piston 43 from a source that provides pressure that varies with engine speed. This pressure may either be the pressure of the oil generated by the oil pump "b," a pressure "c" indicative of the pressure in the exhaust manifold 34 or a pressure "d" indicative of the boost pressure in the supply pipe 24. Thus, in this way the boost pressure can be easily limited while at the same time avoiding complex systems for controlling the speed at which the turbocharger 32 is driven, such as using the conventional type of pop off or pressure limiting valve.

Rather than controlling the throttle valve 39 by such a servo motor as the servo motor 41, an electrical solenoid operator, shown in phantom in FIG. 2 and identified generally by the reference numeral 47 may be provided. The solenoid 47 has an armature 48 that is coupled to the throttle lever 45 through a link 49 and is energized by a lead 51 which may be controlled by a pressure sensor sensing either the oil pump pressure "b," the exhaust manifold pressure "c" or the intake pipe or supply pipe pressure "d". Alternatively, another form of control such as engine speed control using the engine speed signal "a" may be employed for operating the solenoid 49. Other control strategies may also be utilized.

FIG. 3 shows another embodiment of the invention as applied to a four cylinder in-line diesel engine indicated generally by the reference numeral 101. As noted earlier, the fact that the invention is described in conjunction with a four cylinder engine is not to imply that the invention is so limited in applicability. The engine 101 is provided with four direct cylinder fuel injectors 102 that receive fuel under pressure from a high pressure pump and distributor 103 having a control lever 104 that is operated by a remote throttle lever 105 for controlling the speed of the engine 101 in a well known manner.

An intake manifold 106 supplies an air charge to the cylinders of the engine 101 from a supply pipe 107. As is typical with the diesel engine, no speed controlling throttle valve is positioned in the supply pipe 107.

A turbocharger, indicated generally by the reference numeral 108, has a turbine stage 109 that is driven by the exhaust gases from the engine exiting through an exhaust manifold 111. These exhaust gases are then discharged to the atmosphere through an exhaust system shown partially and indicated at 112. The turbine stage 109 drives an impeller or compressor stage 113 through an impeller shaft 114. The compressor 113 draws atmospheric air through an air cleaner 115 and discharges it into the manifold 107.

The boost pressure from the turbocharger 107 is maintained in linear relationship to the engine speed or, alternatively, maximum boost is limited by means of a throttle valve 116 that is positioned in the supply pipe 107 and which is operated by a servo motor 117. The servo motor 117, like one embodiment of FIG. 1, has a piston 118 that is connected to a throttle lever 119 that operates the throttle valve 116 by a link 121. A biasing spring 122 urges the piston 118 and throttle valve 117 to their opened position and this side of the piston 118 is subjected to atmospheric pressure through a vent 123.

The opposite side of the piston 118, in this embodiment, senses the pressure in the supply pipe 107 through a pressure tap 124. As with the previously described embodiment, other arrangements may be employed for controlling the throttle valve 116 so as to limit boost, particularly at high speeds.

It should be readily apparent from the foregoing description that the described embodiments of the invention are very effective in limiting maximum boost pressure generated by a turbocharger in a very simple and efficient manner without adversely affecting the performance of the engine at low and mid ranges. Of course, the foregoing description is that of preferred embodiments of the invention and various changes and modifications may be made without departing from the spirit and scope of the invention, as defined by the appended claims.

We claim:

1. A supercharged internal combustion engine comprising at least one cylinder, an induction system for supplying an air charge to said cylinder, a compressor for compressing an air charge supplied to said cylinder through said induction system, said compressor supplying air at a pressure that does not vary linearly with engine speed, throttle means in said induction system for varying the restriction to air flowing therethrough, and means comprising a pressure responsive motor and a positive displacement pump driven by the engine for operating said throttle means to provide a substantial linear boost pressure in relation to engine speed from said compressor to said cylinder in relation to variations in engine speed.

2. A supercharged internal combustion engine comprising at least one cylinder, an induction system for supplying an air charge to said cylinder, a compressor driven by said engine for compressing an air charge supplied to said cylinder through said induction system, said compressor supplying air at a pressure that does not vary linearly with engine speed, throttle means in said induction system for varying the restriction to air flowing therethrough, and means for operating said throttle means in response to the drive for the compressor by the engine to provide a substantial linear boost pressure in relation to engine speed from said compressor to said cylinder in relation to variations in engine speed.

3. A supercharged internal combustion engine as set forth in claim 2 wherein the compressor is a turbocharger and is driven by the exhaust gas form the engine and a pressure responsive member responsive to the pressure of exhaust gases from the engine operates the throttle means.

4. A supercharged internal combustion engine as set forth in claim 2 wherein the engine comprises a spark ignited engine and further including manually operated throttle means in the induction passage downstream of the throttle means.

5. A supercharged internal combustion engine as set forth in claim 2 wherein the engine operates on a diesel cycle.

6. A supercharged internal combustion engine as set forth in claim 1 wherein the compressor comprises a turbocharger.

7. A supercharged internal combustion engine as set forth in claim 1 wherein the engine comprises a spark ignited engine and further including manually operated throttle means in the induction passage downstream of the throttle means.

8. A supercharged internal combustion engine as set forth in claim 1 wherein the engine operates on a diesel cycle.

* * * * *